United States Patent [19]

Klink

[11] 4,093,145
[45] * June 6, 1978

[54] SELF-LOCKING BELT WINDING DEVICE

[75] Inventor: Wolf-Dieter Klink, Schw.-Gmund-Lindach, Germany

[73] Assignee: REPA GmbH Feinstanzwerk, Schw.-Gmund-Lindach, Germany

[*] Notice: The portion of the term of this patent subsequent to Jun. 6, 1993, has been disclaimed.

[21] Appl. No.: 426,341

[22] Filed: Dec. 17, 1973

[30] Foreign Application Priority Data

Dec. 18, 1972 Germany .............................. 2261890

[51] Int. Cl.² .......................................... B65H 75/48
[52] U.S. Cl. .............................................. 242/107.4 A
[58] Field of Search ...................... 242/107.4, 107 SB; 280/150 SB; 297/388

[56] References Cited

U.S. PATENT DOCUMENTS

| 3,240,510 | 3/1966 | Spouge | 242/107.4 X |
| 3,489,367 | 1/1970 | Kovacs | 242/107.4 |
| 3,578,260 | 5/1971 | Kell | 242/107.4 |

Primary Examiner—Edward J. McCarthy
Attorney, Agent, or Firm—Herbert L. Lerner

[57] ABSTRACT

Self-locking belt wind-up device for safety belts including rotatable cylinder means whereon a safety belt is windable, and a unitary assembly of a bearing block, a pendulum pendulously supported by the bearing block, and a locking lever pivotally supported on the bearing block and engageable by the pendulum for pivoting into a position wherein it is in engagement with the cylinder means and locks the latter against rotation.

4 Claims, 5 Drawing Figures

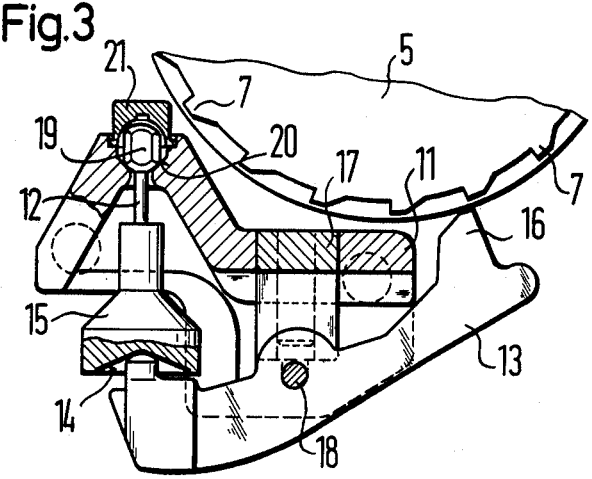
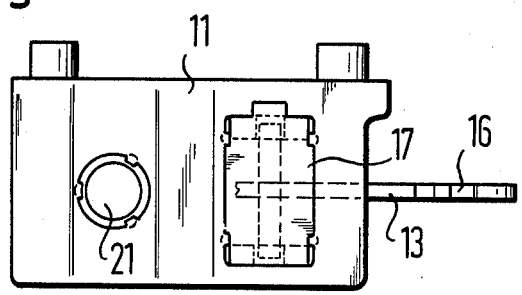
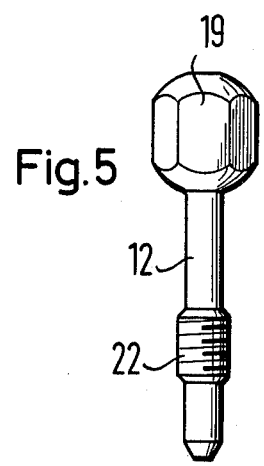

SELF-LOCKING BELT WINDING DEVICE

The invention relates to a self-locking belt wind-up device for safety belts, the device having a pendulum as inertial mass, which acts through a pivotally mounted locking lever on a gear which inhibits withdrawal of the belt.

In heretofore known embodiments of belt wind-up devices of this general type, bearing or supports, that are independent of the pendulum and of the locking lever, are provided for the pendulum and the locking lever. Furthermore, adjustment of a predetermined response threshold of the locking device is relatively costly.

It is accordingly an object of the invention to provide a self-locking belt wind-up device wherein the construction of the bearings or supports of the pendulum and the locking lever as well as the assembly of these elements in the belt wind-up device is simplified over the heretofore known devices of this general type, and wherein adjustment of the response threshold of the locking device is facilitated.

With the foregoing and other objects in view, there is provided, in accordance with the invention, a self-locking belt wind-up device for safety belts comprising rotatable cylinder means whereon a safety belt is windable, and a unitary assembly of a bearing block, a pendulum pendulously supported by the bearing block, and a locking lever pivotally supported on the bearing block and engageable by the pendulum for pivoting into a position wherein it is in engagement with the cylinder means and locks the latter against rotation.

In accordance with other features of the invention, an inertial mass is mounted on the free end of the pendulum and has a lower surface formed in the shape of a cup, one end of the pivotable locking lever being receivable in the cup. The pendulum has a shaft, and means are provided for adjusting the position of the inertial mass along the length of the shaft. For this purpose the inertial mass is formed with an internally threaded bore in which an externally threaded portion of the shaft of the pendulum is threaded.

Other features which are considered as characteristic for the invention are set forth in the appended claims.

Although the invention is illustrated and described herein as embodied in self-locking belt wind-up device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 3 is an enlarged fragmentary view of FIG. 2, partly in section;

FIG. 4 is a top plan view of FIG. 3 especially showing the bearing block thereof; and FIG. 5 is an enlarged side elevational view of the shaft of the pendulum shown in FIG. 3.

Figure 1:
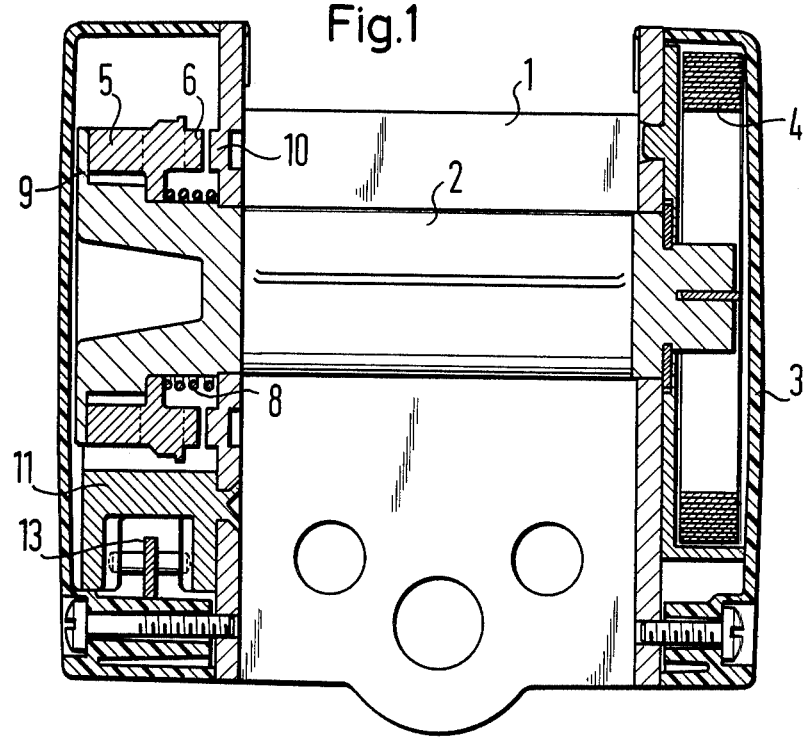
FIG. 1 is a top view partly in section, of a belt wind-up device constructed in accordance with the invention.
Figure 2:
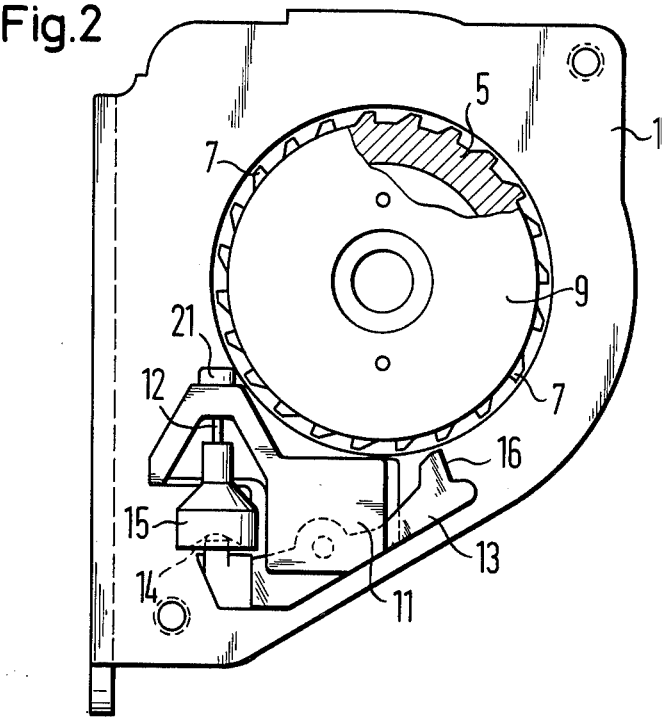
FIG. 2 is a side elevational view of FIG. 1, showing the device of the invention with the cap removed.

Referring now to the drawing, and first, particularly, to FIGS. 1 and 2 thereof, there is shown therein, a self-locking belt wind-up device constructed in accordance with the invention, which includes a belt wind-up drum or cylinder 2 rotatably supported in a housing 1 having a substantially U-shaped cross section and coupled at one end thereof to a rewind spring 4 which is covered by a cap 3. At the other end of the wind-up cylinder 2, a clutch disc 5 is rotatably mounted and is provided with peripherally spaced teeth 6 on the end face thereof as well as peripherally spaced teeth 7 located along the rim thereof. The clutch disc 5 is normally biased, in a conventional manner by a compression spring 8, into engagement with an extension 9 of the belt wind-up cylinder 2, the extension 9 being formed with non-illustrated beveled surfaces onto which the clutch disc 5 is able to run. Adjacent the face of the clutch disc 5 that is provided with the teeth 6, serrations 10 matching the teeth 6 are formed in a wall of the housing 1. To this wall of the housing 1 a bearing block 11 is additionally riveted, as shown in FIGS. 1 to 4. The bearing block 11 serves as a bearing for the pendulum 12, which is constructed as an inertial mass, and for a locking lever 13, which engages at one end thereof in a cup-like depression 14 formed in an inertial mass 15 mounted on the pendulum 12. The other end of the locking lever 13 forms a locking extension arm 16, which engages in the toothing 7 at the outer periphery of the clutch disc 5 whenever the pendulum 15 is swung outwardly. The shaft 18 of the locking lever 13 is held in position by a fitting 17. The pendulum 12 has a shaft supported by a head bearing 19 formed with a spherical bearing surface which is engageable in a pendulum bearing 20 of the bearing block 11, that is closed by a cap 21 in accordance with FIGS. 3 to 5. The inertial mass 15 is mounted on the shaft of the pendulum 12 in a manner that it is adjustable along the length of the pendulum shaft. As shown in FIG. 5, the pendulum shaft is formed with an externally threaded portion 22 which is threadedly secured in an internal thread formed in a bore provided in the inertial mass 15. Instead of a thread 22, the pendulum shaft may be provided with a suitable knurl.

After the wind-up device of the invention is assembled, the response threshold of the locking lever 13 is adjusted in a relatively simple manner by adjusting the position of the inertial mass 15 along the shaft of the pendulum 12. The distance of the locking extension arm 16 from the serration 7 accordingly serves as a measure of the level or magnitude of the response threshold of the locking device.

The embodiments of the invention in which an exclusive property or privilege is claimed are defined as follows:

1. Self-locking belt wind-up device for safety belts comprising rotatable cylinder means whereon a safety belt is windable, and a unitary assembly of a bearing block, a pendulum pendulously supported by said bearing block, and a locking lever pivotally supported independently of said pendulum on said bearing block, said pendulum having a mass on the normally lower end thereof, said locking lever being engageable by said mass and being pivotable thereby into a position wherein it is in engagement with said cylinder means and locks the latter against rotation.

2. Self-locking belt wind-up device for safety belts comprising rotatable cylinder means whereupon a safety belt is windable, and a unitary assembly of a bearing block, a pendulum pendulously supported by said bearing block, and a locking lever pivotally supported on said bearing block and engageable by said pendulum for pivoting into a position wherein it is in engagement with said cylinder means and locks the latter against rotation, said pendulum having a free end, and including an inertial mass mounted on said free end of said pendulum, said inertial mass having a lower surface formed in the shape of a cup, one end of said pivotable locking lever being receivable in said cup.

3. Self-locking belt wind-up device according to claim 2 wherein said pendulum has a shaft, and including means for adjusting the position of said inertial mass along the length of said shaft.

4. Self-locking belt wind-up device according to claim 3 wherein said adjusting means comprises an externally threaded portion formed on said pendulum shaft and threadedly received in an internally threaded bore formed in said inertial mass.

* * * * *